US012682501B2

(12) United States Patent
Taudul et al.

(10) Patent No.: US 12,682,501 B2
(45) Date of Patent: Jul. 14, 2026

(54) ENCODING AND DECODING WITH IMAGE ATLAS FILE

(71) Applicant: Huuuge Global Ltd., Larnaca (CY)

(72) Inventors: Bartosz Taudul, Warsaw (PL);
Wojciech Gasek, Warsaw (PL);
Krzysztof Kondrak, Warsaw (PL)

(73) Assignee: Huuuge Global Ltd., Larnaca (CY)

( * ) Notice: Subject to any disclaimer, the term of this patent is extended or adjusted under 35 U.S.C. 154(b) by 345 days.

(21) Appl. No.: 18/483,069

(22) Filed: Oct. 9, 2023

(65) Prior Publication Data

US 2024/0119638 A1     Apr. 11, 2024

(30) Foreign Application Priority Data

Oct. 11, 2022    (FI) ...................................... 20225916

(51) Int. Cl.
*G06K 9/36*        (2006.01)
*G06T 7/11*        (2017.01)
(Continued)

(52) U.S. Cl.
CPC .................. *G06T 9/00* (2013.01); *G06T 7/11* (2017.01); *G06V 10/56* (2022.01);
(Continued)

(58) Field of Classification Search
CPC ... G06T 9/00; G06T 7/11; G06T 2207/10024; G06T 2207/20132; G06T 9/20;
(Continued)

(56) References Cited

U.S. PATENT DOCUMENTS

2009/0208110 A1     8/2009   Hoppe et al.
2013/0278607 A1     10/2013  Twigg et al.
(Continued)

FOREIGN PATENT DOCUMENTS

WO         2021204700 A1   10/2021

OTHER PUBLICATIONS

Anonymous, "Region growing—Wikipedia, the free encyclopedia", Aug. 28, 2016 (Aug. 28, 2016), XP055416682, retrieved from the Internet: URL:https://web.archive.org/web/20160828020539/https://en.wikipedia.org/wiki/Region_growing, retrieved on Oct. 18, 2017.
(Continued)

*Primary Examiner* — Duy M Dang
(74) *Attorney, Agent, or Firm* — Ziegler IP Law Group, LLC.

(57) ABSTRACT

A method and encoder for encoding target images(s) into an image atlas file. Image elements present in the target images are identified. A set of unique image elements is created including each unique image element identified in the one or more target images and only one instance of each non-unique image element identified in the one or more target images as a corresponding unique image element. The unique image elements of the set are arranged into the image atlas file in a manner that empty spaces in the image atlas file are reduced. A metadata file is generated corresponding to the image atlas file, the metadata file comprising meta information of each target image, wherein meta information of a given target image is indicative of locations and dimensions of unique image elements in the image atlas file that are required to compose the given target image.

23 Claims, 8 Drawing Sheets

(51) Int. Cl.
G06T 9/00 (2006.01)
G06V 10/56 (2022.01)
(52) U.S. Cl.
CPC .............. *G06T 2207/10024* (2013.01); *G06T 2207/20132* (2013.01); *G06V 2201/07* (2022.01)
(58) Field of Classification Search
CPC .......... G06T 3/4038; G06T 3/60; G06T 7/40; G06T 11/00; G06T 13/80; G06V 10/56; G06V 2201/07; H04N 19/88; G06F 16/583
See application file for complete search history.

(56) References Cited

U.S. PATENT DOCUMENTS

2014/0149926 A1    5/2014  Min
2015/0348280 A1*  12/2015  Oriol ..................... G06T 11/40
                                                      345/582

OTHER PUBLICATIONS

Baker Brenda S. et al: "Orthogonal Packings in Two Dimensions", Siam Journal on Computing., vol. 9, No. 4, Nov. 1, 1980 (Nov. 1, 1980), pp. 846-855, XP093105107, US ISSN: 0097-5397, DOI: 10.1137/0209064.

C. Rocchini et al: "Multiple Textures Stitching and Blending on 3D Objects", Eurographics Rendering Workshop, Dec. 31, 1999 (Dec. 31, 1999), pp. 119-139, XP055064409, DOI: 10.1007/978-3-7091-6809-7_12, Retrieved from the Internet: URL:http://citeseerx.ist.psu.edu/viewdoc/download?doi=10.1.1.39.9693&rep=rep1 &type=pdf, retrieved on May 25, 2013.

European Patent Office, Extended European Search Report, Application No. EP 23 20 2055, dated Dec. 12, 2023, 11 pages.

Sassi Mahfoudh Soumaya et al: "Solving CSS-Sprite Packing Problem Using a Transformation to the Probabilistic Non-oriented Bin Packing Problem", Jun. 12, 2018 (Jun. 12, 2018), SAT 2015 18th International Conference, Austin, TX, USA, Sep. 24-27, 2015; [Lecture Notes in Computer Science; Lect.Notes Computer], Springer, Berlin, Heidelberg, pp. 561-573, XP047475014, ISBN: 978-3-540-74549-5, retrieved on Jun. 12, 2018.

Author Unknown "Create sprite sheets and optimized your game graphics" TexturePacker web page, Oct. 10, 2022, Retrieved May 4, 2023, from https://web.arcive.org/web/20221010231451, 18 pages.

Finnish and Patent Registration Office, Search Report, Application No. 20225916, mailed May 22, 2023, 2 pages.

Wang et al. "Factoring Repeated Content Within and Among Images" ACM Transactions on Graphics, vol. 27, No. 3, Article 14 Published Aug. 2008, 10 pages.

* cited by examiner

IDENTITY IMAGE ELEMENTS PRESENT IN TARGET IMAGE(S)
102

CREATE SET OF UNIQUE IMAGE ELEMENTS
104

ARRANGE UNIQUE IMAGE ELEMENTS INTO IMAGE ATLAS FILE
106

GENERATE METADATA FILE
108

402

602a

602b

ENCODING AND DECODING WITH IMAGE ATLAS FILE

TECHNICAL FIELD

The present disclosure relates to a method and encoder for encoding one or more target images into an image atlas file. The present disclosure also relates to a method and decoder for decoding an image atlas file to compose one or more target images at a computing device.

BACKGROUND

In a computing device, rendering and displaying graphical objects takes significant memory resources and storage space. For instance, images being displayed during execution of an application need to be stored in a memory (like flash memory) of the computing device, and thus, require a certain amount of the flash memory to be allocated therefor. In particular, when an image is to be displayed, the image is read from the flash memory and placed in a RAM (Random Access Memory) of the computing device, thereby requiring a certain amount of RAM to be allocated. This process further requires considerable computational resources. If there are a large number of images, the memory requirements can be significantly high.

It will be appreciated that an image is typically provided as an M×N matrix (like a square or a rectangle). However, objects represented in the image often have arbitrary shapes (that need not be square or rectangle); thus, a part of a storage capability of the image is wasted. Also, transmitting a large number of images from one computing device to another (for example, in case of online games) places a huge burden on a network transmission bandwidth.

Therefore, in light of the foregoing discussion, there exists a need to overcome the aforementioned drawbacks associated with known techniques of image storage and transmission.

SUMMARY

An object of the present disclosure is to provide a method for encoding one or more target images into an image atlas file. Another object of the present disclosure is to provide a method for decoding an image atlas file to compose one or more target images at a computing device. Yet another object of the present disclosure is to provide an encoder for encoding one or more target images into an image atlas file. Still another object of the present disclosure is to provide a decoder for decoding an image atlas file to compose one or more target images at a computing device. Yet another object of the present disclosure is to provide a solution that overcomes at least partially the problems encountered in the prior art.

In a first aspect, the present disclosure provides a method for encoding one or more target images into an image atlas file, the method comprising:

identifying image elements present in the one or more target images;

creating a set of unique image elements, the set comprising each unique image element identified in the one or more target images and only one instance of each non-unique image element identified in the one or more target images as a corresponding unique image element;

arranging the unique image elements of the set into the image atlas file in a manner that empty spaces in the image atlas file are reduced; and generating a metadata file corresponding to the image atlas file, the metadata file comprising meta information of each target image, wherein meta information of a given target image is indicative of locations and dimensions of unique image elements in the image atlas file that are required to compose the given target image.

In a second aspect, the present disclosure provides a method for decoding an image atlas file to compose one or more target images at a computing device, the method comprising:

obtaining the image atlas file corresponding to the one or more target images, the image atlas file comprising a set of unique image elements related to the one or more target images, the unique image elements being arranged in the image atlas file in a manner that empty spaces in the image atlas file are reduced;

obtaining a metadata file corresponding to the image atlas file, the metadata file comprising meta information of each target image, wherein meta information of a given target image is indicative of locations and dimensions of unique image elements in the image atlas file that are required to compose the given target image;

for the given target image, extracting from the image atlas file the unique image elements that are required to compose the given target image, based on the meta information of the given target image;

composing the one or more target images from the unique image elements, extracted from the image atlas file, based on corresponding meta information from the metadata file; and displaying the composed one or more target images at the computing device.

In a third aspect, the present disclosure provides an encoder for encoding one or more target images into an image atlas file, wherein the encoder comprises at least one processor configured to:

identify image elements present in the one or more target images;

create a set of unique image elements, the set comprising each unique image element identified in the one or more target images and only one instance of each non-unique image element identified in the one or more target images as a corresponding unique image element;

arrange the unique image elements of the set into the image atlas file in a manner that empty spaces in the image atlas file are reduced; and generate a metadata file corresponding to the image atlas file, the metadata file comprising meta information of each target image, wherein meta information of a given target image is indicative of locations and dimensions of unique image elements in the image atlas file that are required to compose the given target image.

In a fourth aspect, the present disclosure provides a decoder for decoding an image atlas file to compose one or more target images at a computing device, the decoder comprising at least one processor configured to:

obtain the image atlas file corresponding to the one or more target images, the image atlas file comprising a set of unique image elements related to the one or more target images, the unique image elements being arranged in the image atlas file in a manner that empty spaces in the image atlas file are reduced;

obtain a metadata file corresponding to the image atlas file, the metadata file comprising meta information of each target image, wherein meta information of a given target image is indicative of locations and dimensions of unique image elements in the image atlas file that are required to compose the given target image;

for the given target image, extract from the image atlas file the unique image elements that are required to compose the given target image, based on the meta information of the given target image;

compose the one or more target images from the unique image elements, extracted from the image atlas file, based on corresponding meta information from the metadata file; and display the composed one or more target images at the computing device.

Embodiments of the present disclosure substantially eliminate or at least partially address the aforementioned problems in the prior art, enable efficient and effective encoding of one or more target images into an image atlas file and its corresponding metadata file that are significantly smaller in size as compared to a total size of the target images, and facilitate a significant reduction in a requirement of computational resources for memory, processing and network transfer in comparison to conventional encoding methods and encoders.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
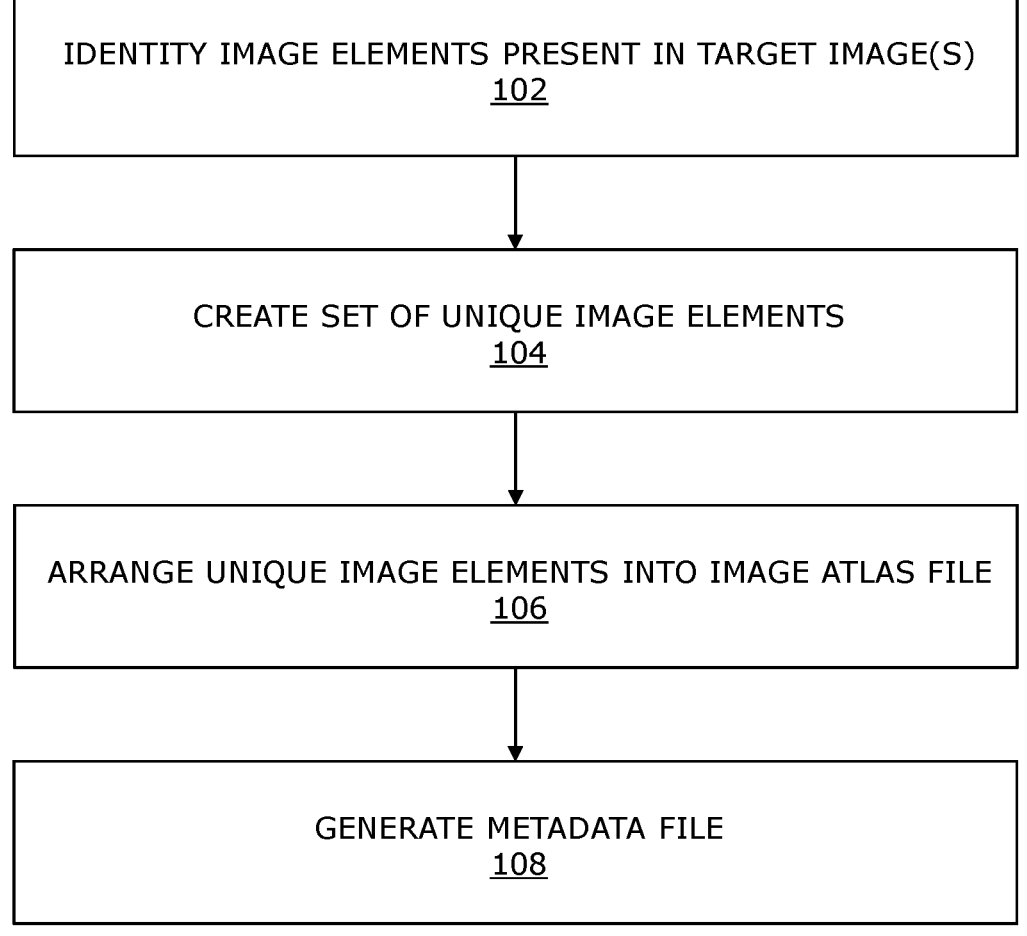
FIG. 1 depicts steps of a method for encoding one or more target images into an image atlas file, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides a method for encoding one or more target images into an image atlas file, the method comprising:

identifying image elements present in the one or more target images;

creating a set of unique image elements, the set comprising each unique image element identified in the one or more target images and only one instance of each non-unique image element identified in the one or more target images as a corresponding unique image element;

arranging the unique image elements of the set into the image atlas file in a manner that empty spaces in the image atlas file are reduced; and generating a metadata file corresponding to the image atlas file, the metadata file comprising meta information of each target image, wherein meta information of a given target image is indicative of locations and dimensions of unique image elements in the image atlas file that are required to compose the given target image.

In a second aspect, the present disclosure provides a method for decoding an image atlas file to compose one or more target images at a computing device, the method comprising:

obtaining the image atlas file corresponding to the one or more target images, the image atlas file comprising a set of unique image elements related to the one or more target images, the unique image elements being arranged in the image atlas file in a manner that empty spaces in the image atlas file are reduced;

obtaining a metadata file corresponding to the image atlas file, the metadata file comprising meta information of each target image, wherein meta information of a given target image is indicative of locations and dimensions of unique image elements in the image atlas file that are required to compose the given target image;

for the given target image, extracting from the image atlas file the unique image elements that are required to compose the given target image, based on the meta information of the given target image;

composing the one or more target images from the unique image elements, extracted from the image atlas file, based on corresponding meta information from the metadata file; and displaying the composed one or more target images at the computing device.

In a third aspect, the present disclosure provides an encoder for encoding one or more target images into an image atlas file, wherein the encoder comprises at least one processor configured to:

identify image elements present in the one or more target images;

create a set of unique image elements, the set comprising each unique image element identified in the one or more target images and only one instance of each non-unique image element identified in the one or more target images as a corresponding unique image element;

arrange the unique image elements of the set into the image atlas file in a manner that empty spaces in the image atlas file are reduced; and generate a metadata file corresponding to the image atlas file, the metadata file comprising meta information of each target image, wherein meta information of a given target image is indicative of locations and dimensions of unique image elements in the image atlas file that are required to compose the given target image.

In a fourth aspect, the present disclosure provides a decoder for decoding an image atlas file to compose one or more target images at a computing device, the decoder comprising at least one processor configured to:

obtain the image atlas file corresponding to the one or more target images, the image atlas file comprising a set of unique image elements related to the one or more target images, the unique image elements being arranged in the image atlas file in a manner that empty spaces in the image atlas file are reduced;

obtain a metadata file corresponding to the image atlas file, the metadata file comprising meta information of each target image, wherein meta information of a given target image is indicative of locations and dimensions of unique image elements in the image atlas file that are required to compose the given target image;

for the given target image, extract from the image atlas file the unique image elements that are required to compose the given target image, based on the meta information of the given target image;

compose the one or more target images from the unique image elements, extracted from the image atlas file, based on corresponding meta information from the metadata file; and display the composed one or more target images at the computing device.

The aforementioned method for encoding and the aforementioned encoder enable efficient data compression by packing the unique image elements of the target image(s) into a single image atlas file. Pursuant to the present disclosure, when creating the set of unique image elements, only one instance of each non-unique image element is included in the set as a corresponding unique image element, while other duplicate instances of said non-unique image element are deleted. This greatly reduces a size of the image atlas file. Moreover, multiple target images often have unique image elements that are common between them. Thus, the image atlas file and its corresponding metadata file are significantly smaller in size as compared to a total size of the multiple target images. Consequently, by storing and transferring the image atlas file and the metadata file, instead of the multiple target images, a requirement of computational resources for memory, processing and network transfer is greatly reduced in comparison to conventional encoding methods and encoders.

It will be appreciated that aforementioned method enables efficient encoding of the one or more target images into the image atlas file, that helps in reducing the size of the image atlas file and its corresponding metadata file as compared to the total size of the multiple target images.

Indeed, combination of the generated metadata file and the corresponding image atlas file is the encoded one or more target images. As an example of use case; Step 1: target images are encoded to generate the metadata and the image atlas. Step 2: the encoded one or more target images (i.e., the combination of the generated metadata file and corresponding image atlas) are provided to target application of the target device (such a as a portable computing device application/game etc). Step 3: the image atlas and the metadata are used by the target application to construct (decode) the target images. This process has been found out to reduce both the bandwidth of data communication and required memory footprint in the target device. Also decoding is fast and does not require large computational power.

The aforementioned method for decoding and the aforementioned decoder complements the aforementioned method of encoding and the aforementioned encoder, respectively, by enabling a computing device to utilise the image atlas file and the corresponding metadata file to compose the target images for display thereat. By storing the image atlas file and the corresponding metadata file at the computing device, instead of the multiple target images, a requirement of computational resources for data storage and memory is greatly reduced. The target images are not required to be stored, and are composed only when they are required to be displayed. This is particularly beneficial for software applications (for example, such as online games, simulation software, and the like) requiring a large number of images to be displayed, which would otherwise require a large space for storing the images.

Pursuant to embodiments, the image atlas file and the metadata file are stored in a memory of the computing device during runtime execution, to allow for composing and displaying of the one or more target images at the computing device. Only the image atlas file and the metadata file are stored locally at the computing device; the one or more target images are not required to be stored, and can be composed each and every time they are required to be displayed at the computing device. This is particularly beneficial for software applications (for example, such as online games, simulation software, and the like) requiring a large number of images to be displayed, which would otherwise require a large space for storing the images. Locally storing the image atlas file and the metadata file, instead of storing the one or more target images, may also help to reduce an amount of time taken to display the one or more target images, because of a smaller amount of data to be transferred between a flash memory and a Random Access Memory (RAM) of the computing device.

Throughout the present disclosure, the term "target image" refers to a graphical image that is to be displayed at a given computing device. In an example, the target image may be a frame of a gaming interface to be displayed at a display of the computing device. Examples of such a computing device include, but are not limited to, a smartphone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, and a desktop computer.

Throughout the present disclosure, the term "image atlas file" refers to a type of image file in which unique image elements (identified from one or more target images) are arranged (namely, packed). Even though the unique image elements may typically have varying dimensions, the unique image elements can be packed into the image atlas file efficiently, as described later. Optionally, the one or more target images refer to one or more graphical images that are to be displayed at the computing device, In some implementations, the image atlas file is in a .png file format. The .png (Portable Network Graphics) file format occupies lesser space in comparison to other image formats, whilst providing a greater visual detail in an image atlas file. Thus, it beneficially reduces the memory requirements. However, it will be appreciated that other file formats such as, .jpeg (Joint Photographic Experts Group), .svg (Scalable Vector Graphics), .webp (Web Picture), and .tiff (Tagged Image File format) may be employed without limiting the scope of the present disclosure.

The image elements represent a portion of an object. The image elements could be in a form of simple or complex geometric shapes. In an example implementation for an online game, the image elements could be representative of game characters or their portions, other virtual objects (for example, such as vehicles, buildings, etc.) or their portions. As an example, a given image element could be representative of a head, a torso, a leg, an arm, or another body part of a game character.

According to an embodiment, the step of identifying the image elements comprises:

dividing a given target image into a plurality of blocks;

for each horizontal line of blocks, merging non-transparent blocks located consecutively on said horizontal line to create a corresponding horizontal image sub-element;

vertically merging consecutive horizontal image sub-elements that start at a same horizontal position coordinate or at a predefined horizontal distance from the same horizontal position coordinate, and that have a same length or have a length greater than or smaller than the same length by a predefined length, to create a corresponding image element;

for each vertical line of blocks, merging non-transparent blocks located consecutively on said vertical line to create a corresponding vertical image sub-element;

horizontally merging consecutive vertical image sub-elements that start at a same vertical position coordinate or at a predefined vertical distance from the same vertical position coordinate, and that have a same breadth or have a breadth greater than or smaller than the same breadth by a predefined breadth, to create a corresponding image element;

if a total number of image elements created from the horizontal image sub-elements is smaller than or equal to a total number of image elements created from the vertical image sub-elements, selecting the image elements created from the horizontal image sub-elements; and if the total number of image elements created from the horizontal image sub-elements is larger than the total number of image elements created from the vertical image sub-elements, selecting the image elements created from the vertical image sub-elements.

It will be appreciated that "length" is measured in a horizontal direction, while "breadth" is measured in a vertical direction. The predefined horizontal distance and/or the predefined vertical distance could be selected based on sizes of the blocks. Optionally, the predefined horizontal distance and/or the predefined vertical distance lie in a range of 1 to 50 pixels; more optionally, in a range of 1 to 20 pixels; yet more optionally, in a range of 1 to 10 pixels. The predefined length and/or the predefined breadth could be selected based on the sizes of the blocks. Optionally, the predefined length and/or the predefined breadth lie in a range of 1 to 50 pixels; more optionally, in a range of 1 to 20 pixels; yet more optionally, in a range of 1 to 10 pixels.

Optionally, the step of identifying the image elements further comprises determining whether a given block is transparent or non-transparent, based on alpha values for pixels of the given block. Pursuant to embodiments, only non-transparent blocks are used to create the image elements. This is also referred to as "alpha elimination" hereinafter.

A technical effect of identifying the image elements present in the one or more target images is appropriately and efficiently identifying image elements from one or more target image based on sizes of the blocks into which a given target image is divided. The present method discloses how the image elements are created from horizontal image sub-elements and from vertical image sub-elements and then an image element set that is smaller is selected.

Additionally, optionally, the step of identifying the image elements further comprises:

detecting, for a given block, whether alpha values of all pixels of the given block lie below a predefined threshold value;

when it is detected that the alpha values of all the pixels of the given block lie below the predefined threshold value, discarding the given block. This results in a better compression ratio, and further optimises the method of encoding. Optionally, the predefined threshold value may lie in a range of 0 to 0.2; more optionally, in a range of 0 to 0.15; yet more optionally, in a range of 0 to 0.1, wherein 0 and 1 are a minimum possible alpha value and a maximum possible alpha value, respectively.

The blocks could be of a predefined size, for example, such as 4×4 pixels, 8×8 pixels, 16×16 pixels and so on. The predefined size could be configurable. Alternatively, the blocks could be of varying sizes. Optionally, in this regard, the step of dividing the given target image into the plurality of blocks is performed iteratively. The given target image could be divided into the plurality of blocks, based on at least one parameter. The at least one parameter comprises at least one of: similarity of colour values of neighbouring pixels, a gradient of colour values across pixels, a frequency with which colour values change across pixels.

Advantageously, the method allows an efficient identification of the image elements from the one or more target images based on sizes of the blocks into which a given target image is divided. It will be appreciated that the method supports the creation of the image elements from the horizontal image sub-elements and from the vertical image sub-elements. Moreover, the method supports selecting an image element set that is smaller in size.

Additionally, optionally, a given block is iteratively divided into smaller blocks to discard groups of neighbouring pixels whose alpha values lie below the aforesaid predefined threshold value. This allows to perform the division of the given target image based on distribution and density of transparent pixels or near transparent pixels in the given target image. Herein, the term "near transparent pixels" refers to pixels whose alpha values lie below the predefined threshold value.

Moreover, optionally, the method further comprises cropping out rows and/or columns of consecutive transparent pixels from a given image element prior to arranging the image elements into the image atlas file. This allows to reduce wastage of space in the image atlas file, thereby enabling better packing efficiency when packing the image elements into the image atlas file. This further results in a better compression ratio, and further optimises the method of encoding.

Optionally, the step of creating the set of unique image elements comprises classifying the image elements identified in the one or more target images into unique image elements and non-unique image elements. As mentioned earlier, the step of creating the set of unique image elements comprises including only one instance of each non-unique image element as a corresponding unique image element.

According to an embodiment, the step of arranging the image elements into the image atlas file comprises:

sorting the image elements by length or breadth; and packing the image elements into the image atlas file one-by-one, in an order of decreasing length or breadth.

It will be appreciated that when the image elements created from the horizontal image sub-elements are selected, the image elements are sorted by length. Whereas, when the image elements created from the vertical image sub-elements are selected, the image elements are sorted by breadth. This allows to pack the image elements in a manner that empty spaces in the image atlas file are reduced.

Optionally, a given image element is packed at a predefined corner of a free space available in the image atlas file. As an example, said packing can take place from an uppermost leftmost corner of the free space available. Alternatively, the packing can take place from one of: an uppermost rightmost corner, a lowermost leftmost corner, or lowermost rightmost corner.

Optionally, in this regard, the step of arranging the image elements into the image atlas file comprises:

dividing the free space available in the image atlas file, after an $N^{th}$ image element is packed, into two parts; and packing an $N+1^{th}$ image element at the predefined corner of one of the two parts of the free space.

The one of the two parts of the free space could be selected based on a length or breadth of the $N+1^{th}$ image element. This allows to pack the image elements in a most efficient manner, thereby significantly reducing any empty space in the image atlas file.

Moreover, optionally, the step of arranging the image elements into the image atlas file comprises layering image elements that include a common region having same pixel values, wherein the layered image elements overlap at least partially in the image atlas file. As an example, certain portions of two different unique image elements may have same pixel values; in such a case, the two different unique image elements may be layered in a manner that their respective portions overlap. This allows to utilise the available space in the image atlas file in an efficient manner. It will be appreciated that the image elements that are layered together need not have same alpha values; in some implementations, it is sufficient to have same colour values.

Optionally, the step of arranging the image elements into the image atlas file is performed iteratively. In this regard, a given image element could be re-arranged in the image atlas file, based on a size of the given image element, a shape of the given image element, whether the given image element can be rotated to fit better. This greatly reduces any wastage of space in the image atlas file, thereby reducing empty spaces in the image atlas file.

Throughout the present disclosure, the term "metadata file" refers to a file that stores meta information of the one or more target images. As mentioned earlier, the meta information of a given target image is indicative of locations and dimensions of unique image elements in the image atlas file that are required to compose the given target image. Thus, the meta information enables in extracting the unique image elements from the image atlas file.

Additionally, the meta information of the given target image indicates how the given target image can be composed from the unique image elements. Optionally, in this regard, the meta information of the given target image is indicative of, for a given unique image element that is required to compose the given target image, at least one of: a rotation to be applied to the given unique image element, a translation to be applied to the given unique image element, a scaling to be applied to the given unique image element, a level of transparency to be applied to the given unique image element, a geometric transformation to be applied to the given unique image element, an axis or a centre about which the given unique image element is to be mirrored, whether the given unique image element is to be duplicated, a location in the given target image where the given unique image element is to be inserted. These details could be associated with a unique identifier of the given unique image element, to enable identification and look up of the given unique element in a fast and efficient manner.

As an example, an amount of rotation to be applied to a first unique image element may be 60 degrees in a clockwise direction, while an amount of rotation to be applied to a second unique image element may be 45 degrees in an anticlockwise direction. As another example, the first unique image element may be required to be scaled down to $\frac{1}{4}^{th}$, while the second unique image element may not be required to be scaled at all. As yet another example, a given geometric transformation may be required to be applied to skew the first unique image element along a first direction.

It will be appreciated that the aforesaid details allow a single unique image element to be packed into the image atlas file, without a need to store multiple differently-oriented instances, multiple scaled-down or scaled-up instances, and/or multiple mirrored instances of the same unique image element. In this way, the metadata file allows for greatly reducing the size of the image atlas file.

It will also be appreciated that a same unique image element may be reused more than once in a single target image; in such a case, the meta information of the given target image indicates the aforesaid details for each instance of the same unique image element that is required for composing the given target image. This enables correct decoding of the image atlas file, even when the same unique image element is packed just once in the image atlas file. As an example, there could be two instances of the same unique image element in the given target image; in such a case, the meta information of the given target image indicates the aforesaid details for each of the two instances of the unique image element independently. This is very beneficial as compared to storing two separate instances of the unique image element in the image atlas file, because the meta information typically has a significantly small size in comparison to the image atlas file.

Optionally, the step of generating the metadata file comprises:

determining a disposition of a given image element in a given target image;

selecting a unique image element from the set of unique image elements that matches the given image element; and generating meta information of the given target image, based on the disposition of the given image element in the given target image and a unique identifier of the unique image element that matches the given image element.

Hereinabove, said matching can be performed as it is, or upon applying at least one of: rotation, scaling, a geometric transformation, mirroring, to the unique image element. The term "disposition" as used herein refers to a position or orientation of a given image element in a coordinate system of a given target image.

The technical effect of the aforementioned method is the efficient encoding of the one or more target images into the image atlas file. This is achieved through a systematic process of identifying the image elements within the one or more target images, based on their representation of object portions. The method involves dividing the one or more target images into the plurality of blocks, merging the plurality of blocks to create the horizontal image sub-element and the vertical image sub-elements, and forming image elements by further merging the horizontal image sub-element and the vertical image sub-elements. The selection of image elements is based on comparing quantities from the horizontal image sub-element and the vertical image sub-elements. This approach optimizes the use of space within the image atlas file by arranging the set of unique image elements to minimize empty areas. Additionally, the generation of the metadata file facilitates the composition of the one or more target images, further contributing to reduced computational resource requirements and efficient data storage and transfer.

The present disclosure also relates to the encoder of the third aspect and the decoder of the fourth aspect, as described above. Various embodiments and variants disclosed above, with respect to the aforementioned first aspect and the aforementioned second aspect, apply mutatis mutandis to the encoder and the decoder, respectively.

It will be appreciated that the encoder comprises at least one processor to perform the aforementioned method for encoding, Optionally, when identifying the image elements, the at least one processor of the encoder is configured to:

divide a given target image into a plurality of blocks;

for each horizontal line of blocks, merge non-transparent blocks located consecutively on said horizontal line to create a corresponding horizontal image sub-element;

vertically merge consecutive horizontal image sub-elements that start at a same horizontal position coordinate or at a predefined horizontal distance from the same horizontal position coordinate, and that have a same length or have a length greater than or smaller than the same length by a predefined length, to create a corresponding image element;

for each vertical line of blocks, merge non-transparent blocks located consecutively on said vertical line to create a corresponding vertical image sub-element;

horizontally merge consecutive vertical image sub-elements that start at a same vertical position coordinate or at a predefined vertical distance from the same vertical position coordinate, and that have a same breadth or have a breadth greater than or smaller than the same breadth by a predefined breadth, to create a corresponding image element;

if a total number of image elements created from the horizontal image sub-elements is smaller than or equal to a total number of image elements created from the vertical image sub-elements, select the image elements created from the horizontal image sub-elements; and if the total number of image elements created from the horizontal image sub-elements is larger than the total number of image elements created from the vertical image sub-elements, select the image elements created from the vertical image sub-elements.

Additionally, optionally, when identifying the image elements, the at least one processor of the encoder is configured to:

detect, for a given block, whether alpha values of all pixels of the given block lie below a predefined threshold value;

when it is detected that the alpha values of all the pixels of the given block lie below the predefined threshold value, discard the given block.

Optionally, the at least one processor of the encoder is configured to divide the given target image into the plurality of blocks iteratively. Optionally, the given target image is divided into the plurality of blocks, based on at least one parameter comprising at least one of: similarity of colour values of neighbouring pixels, a gradient of colour values across pixels, a frequency with which colour values change across pixels.

Optionally, the at least one processor of the encoder is configured to crop out rows and/or columns of consecutive transparent pixels from a given image element prior to arranging the image elements into the image atlas file.

Optionally, when arranging the image elements into the image atlas file, the at least one processor of the encoder is configured to:

sort the image elements by length or breadth; and pack the image elements into the image atlas file one-by-one, in an order of decreasing length or breadth.

Additionally, optionally, a given image element is packed at a predefined corner of a free space available in the image atlas file.

Moreover, optionally, when arranging the image elements into the image atlas file, the at least one processor of the encoder is configured to layer image elements that include a common region having same pixel values, wherein the layered image elements overlap at least partially in the image atlas file.

Furthermore, it will be appreciated that the at least one processor may be implemented as a single hardware processor and/or a plurality of hardware processors operating in a parallel architecture or in a distributed architecture. Examples of such processors include, but are not limited to, Central Processing Units (CPUs), Graphical Processing Units (GPUs), servers, microprocessors, micro-controllers, Complex Instruction Set Computer (CISC) chips, Reduced Instruction Set Computer (RISC) chips, Very Long Instruction Word (VLIW) chips, and Field Programmable Gate Array (FPGA) chips.

In one implementation, the method of encoding and the encoder are implemented by at least one server. In such a case, the at least one processor of the encoder is implemented as the at least one server. In another implementation, the method of encoding and the encoder are implemented by another computing device. In such a case, the at least one processor of the encoder is implemented as a processor of the another computing device. In the another implementation, the another computing device could be, for example, connected to a digital camera, a scientific measurement apparatus, a medical imaging apparatus, or similar.

In yet another implementation, a codec includes at least one encoder pursuant to the aforementioned third aspect, and at least one decoder pursuant to the aforementioned fourth aspect. Optionally, the at least one encoder and the at least one decoder are both present within a single computing device. Such a codec could be beneficially employed for bi-directional communication, for example, in bi-directional video conferencing apparatus.

Pursuant to embodiments of the present disclosure, at least one encoder (pursuant to the aforementioned third aspect) and a plurality of decoders (pursuant to the aforementioned fourth aspect) can be employed for various purposes, for example, for multi-casting content distribution, online games, simulation, and the like. As an example, the at least one encoder can be implemented at a game server, whereas the plurality of decoders can be implemented at computing devices of users playing one or more games served by the game server. In this example, the game server generates the image atlas file and the metadata file for the one or more target images, and transmits them to the computing devices, instead of directly transmitting the one or more target images.

Moreover, in some implementations, the at least one processor of the encoder is configured to send the image atlas file and the metadata file to the decoder, either via a communication network or via a direct connection. The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks, and Worldwide Interoperability for Microwave Access (WiMAX) networks.

In other implementations, the at least one processor of the encoder is configured to send the image atlas file and the metadata file to a data server for storing in a data repository. The data server is arranged to be accessible to the decoder for subsequently decoding the image atlas file. In such implementations, the at least one processor of the decoder is configured to access the image atlas file and the metadata file from the data server.

In yet other implementations, the at least one processor of the decoder is configured to retrieve the image atlas file and the metadata file from a non-transitory (namely, non-transient) computer-readable storage medium, such as a hard drive, an optical disc and/or a Solid-State Drive (SSD).

Furthermore according to one aspect a method for encoding one or more target images into an image atlas file is provided. This is achieved, by an encoder that comprises at least one processor to perform the method, the method comprising:

identifying image elements present in the one or more target images, wherein the image elements represent a portion of an object, wherein the one or more target images refer to one or more graphical images that are to be displayed at a computing device, wherein identifying the image elements comprises:

dividing a given target image into a plurality of blocks;

for each horizontal line of blocks, merging non-transparent blocks located consecutively on said horizontal line to create a corresponding horizontal image sub-element;

vertically merging consecutive horizontal image sub-elements that start at a same horizontal position coordinate or at a predefined horizontal distance from the same horizontal position coordinate, and that have a same length or have a length greater than or smaller than the same length by a predefined length, to create a corresponding image element;

for each vertical line of blocks, merging non-transparent blocks located consecutively on said vertical line to create a corresponding vertical image sub-element;

horizontally merging consecutive vertical image sub-elements that start at a same vertical position coordinate or at a predefined vertical distance from the same vertical position coordinate, and that have a same breadth or have a breadth greater than or smaller than the same breadth by a predefined breadth, to create a corresponding image element, wherein the predefined horizontal distance and the predefined vertical distance are selected based on sizes of the blocks and lie in a range of 1 to 50 pixels, and wherein the predefined length and the predefined breadth are selected based on sizes of the blocks and lie in a range of 1 to 50 pixels;

if a total number of image elements created from the horizontal image sub-elements is smaller than or equal to a total number of image elements created from the vertical image sub-elements, selecting the image elements created from the horizontal image sub-elements; and if the total number of image elements created from the horizontal image sub-elements is larger than the total number of image elements created from the vertical image sub-elements, selecting the image elements created from the vertical image sub-elements;

Furthermore method comprises creating a set of unique image elements, wherein creating the set of unique image elements comprises classifying the image elements identified in the one or more target images into unique image elements and non-unique image elements, the set comprising each unique image element identified in the one or more target images and only one instance of each non-unique image element identified in the one or more target images as a corresponding unique image element;

arranging the unique image elements of the set into the image atlas file in a manner that empty spaces in the image atlas file are reduced;

generating a metadata file corresponding to the image atlas file, the metadata file comprising meta information of each target image, wherein meta information of a given target image is indicative of locations and dimensions of unique image elements in the image atlas file that are required to compose the given target image;

storing the image atlas file and the metadata file in a memory of the computing device; and sending the image atlas file and the metadata file to a decoder.

This way the image atlas file and the metadata related to the file can be provided to the decoder. Bandwidth requirements of communication link, memory footprint related issues are thus improved.

Optionally: decoding an image atlas file to compose one or more target images at a computing device, decoding the image atlas file sent to the decoder, the method comprising:

obtaining the image atlas file corresponding to the one or more target images, from the decoder, wherein the image atlas file refers to a type of image file in which unique image elements identified from the one or more target images are arranged, wherein the one or more target images refer to one or more graphical images that are to be displayed at the computing device, the image atlas file comprising a set of unique image elements related to the one or more target images, the unique image elements being arranged in the image atlas file in a manner that empty spaces in the image atlas file are reduced;

obtaining a metadata file corresponding to the image atlas file, from the decoder, the metadata file comprising meta information of each target image, wherein meta information of a given target image is indicative of locations and dimensions of unique image elements in the image atlas file that are required to compose the given target image;

for the given target image, extracting from the image atlas file the unique image elements that are required to compose the given target image, based on the meta information of the given target image;

composing the one or more target images from the unique image elements, extracted from the image atlas file, based on corresponding meta information from the metadata file; and displaying the composed one or more target images at the computing device.

In addition, an encoder for encoding one or more target images into an image atlas file is provided. The encoder comprises at least one processor configured to:

identify image elements present in the one or more target images, wherein the image elements represent a portion of an object, wherein the one or more target images refer to one or more graphical images that are to be displayed at a computing device, wherein, when identifying the image elements, the at least one processor is configured to:

divide a given target image into a plurality of blocks;

for each horizontal line of blocks, merge non-transparent blocks located consecutively on said horizontal line to create a corresponding horizontal image sub-element;

vertically merge consecutive horizontal image sub-elements that start at a same horizontal position coordinate or at a predefined horizontal distance from the same horizontal position coordinate, and that have a same length or have a length greater than or smaller than the same length by a predefined length, to create a corresponding image element;

for each vertical line of blocks, merge non-transparent blocks located consecutively on said vertical line to create a corresponding vertical image sub-element;

horizontally merge consecutive vertical image sub-elements that start at a same vertical position coordinate or at a predefined vertical distance from the same vertical position coordinate, and that have a same breadth or have a breadth greater than or smaller than the same breadth by a predefined breadth, to create a corresponding image element, wherein the predefined horizontal distance and the predefined vertical distance are selected based on sizes of the blocks and lie in a range of 1 to 50 pixels, and wherein the predefined length and the predefined breadth are selected based on sizes of the blocks and lie in a range of 1 to 50 pixels;

if a total number of image elements created from the horizontal image sub-elements is smaller than or equal to a total number of image elements created from the vertical image sub-elements, select the image elements created from the horizontal image sub-elements; and if the total number of image elements created from the horizontal image sub-elements is larger than the total number of image elements created from the vertical image sub-elements, select the image elements created from the vertical image sub-elements;

create a set of unique image elements, wherein to create the set of unique image elements, the processor is configured to classify the image elements identified in the one or more target images into unique image elements and non-unique image elements, the set comprising each unique image element identified in the one or more target images and only one instance of each non-unique image element identified in the one or more target images as a corresponding unique image element;

arrange the unique image elements of the set into the image atlas file in a manner that empty spaces in the image atlas file are reduced;

generate a metadata file corresponding to the image atlas file, the metadata file comprising meta information of each target image, wherein meta information of a given target image is indicative of locations and dimensions of unique image elements in the image atlas file that are required to compose the given target image; and store the image atlas file and the metadata file in a memory of the computing device; and send the image atlas file and the metadata file to a decoder.

Further optionally a decoder for decoding an image atlas file to compose one or more target images at a computing device, decoding the image atlas file sent to the decoder, the decoder may also comprise at least one processor configured to:

obtain the image atlas file corresponding to the one or more target images, from the decoder, wherein the image atlas file refers to a type of image file in which unique image elements identified from the one or more target images are arranged, wherein the one or more target images refer to one or more graphical images that are to be displayed at the computing device, the image atlas file comprising a set of unique image elements related to the one or more target images, the unique image elements being arranged in the image atlas file in a manner that empty spaces in the image atlas file are reduced;

obtain a metadata file corresponding to the image atlas file, from the decoder, the metadata file comprising meta information of each target image, wherein meta information of a given target image is indicative of locations and dimensions of unique image elements in the image atlas file that are required to compose the given target image;

for the given target image, extract from the image atlas file the unique image elements that are required to compose the given target image, based on the meta information of the given target image;

compose the one or more target images from the unique image elements, extracted from the image atlas file, based on corresponding meta information from the metadata file; and display the composed one or more target images at the computing device.

DETAILED DESCRIPTION OF DRAWINGS

Referring to FIG. 1, illustrated are steps of a method for encoding one or more target images into an image atlas file, in accordance with an embodiment of the present disclosure. At a step 102, image elements present in the one or more target images are identified. At a step 104, a set of unique image elements is created, wherein the set comprises each unique image element identified in the one or more target images and only one instance of each non-unique image element identified in the one or more target images as a corresponding unique image element. At a step 106, the unique image elements of the set are arranged into the image atlas file in a manner that empty spaces in the image atlas file are reduced. At a step 108, a metadata file corresponding to the image atlas file is generated, wherein the metadata file comprises meta information of each target image. Meta information of a given target image is indicative of locations and dimensions of unique image elements in the image atlas file that are required to compose the given target image.

Figure 2:
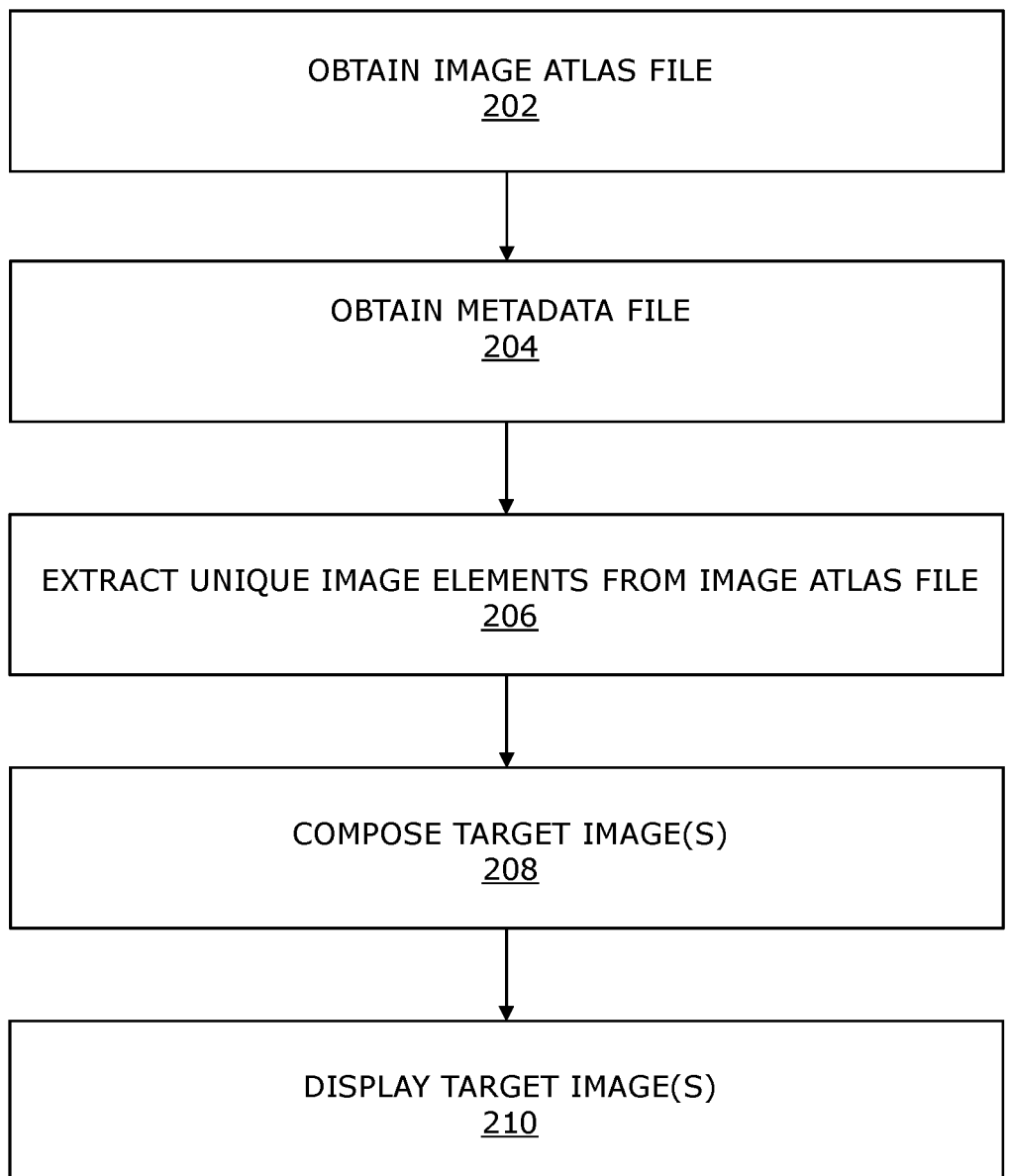
FIG. 2 illustrates steps of a method for decoding an image atlas file to compose one or more target images at a computing device, in accordance with an embodiment of the present disclosure.

Referring to FIG. 2, illustrated are steps of a method for decoding an image atlas file to compose one or more target images at a computing device, in accordance with an embodiment of the present disclosure. At a step 202, the image atlas file corresponding to the one or more target images is obtained, wherein the image atlas file comprises a set of unique image elements related to the one or more target images, the unique image elements being arranged in the image atlas file in a manner that empty spaces in the image atlas file are reduced. At a step 204, a metadata file corresponding to the image atlas file is obtained, wherein the metadata file comprises meta information of each target image. Meta information of a given target image is indicative of locations and dimensions of unique image elements in the image atlas file that are required to compose the given target image. At a step 206, for the given target image, the unique image elements that are required to compose the given target image are extracted from the image atlas file, based on the meta information of the given target image. At a step 208, the one or more target images are composed from the unique image elements, extracted from the image atlas file, based on corresponding meta information from the metadata file. At a step 210, the one or more target images are displayed at the computing device.

The aforementioned steps are only illustrative and other alternatives can also be provided where one or more steps are added, one or more steps are removed, or one or more steps are provided in a different sequence without departing from the scope of the claims herein.

Figure 3:
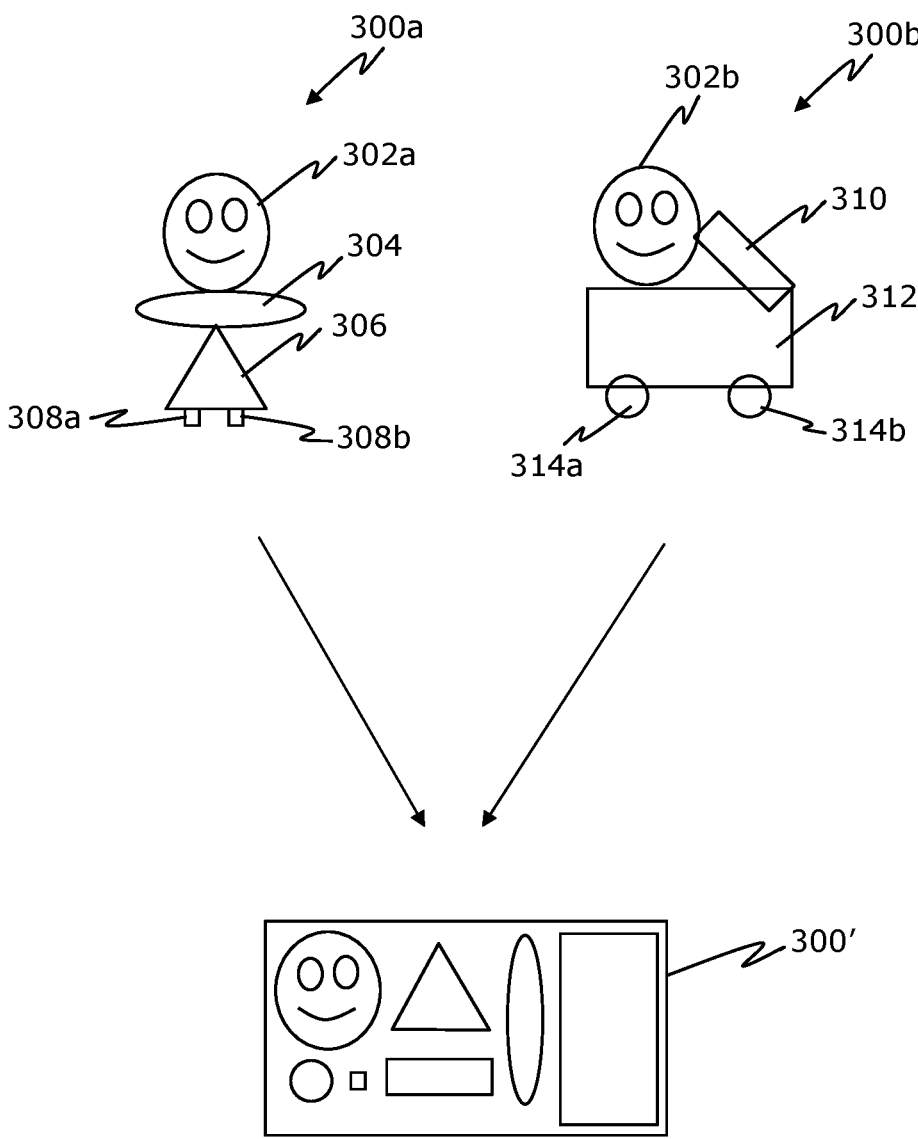
FIG. 3 depicts simple schematic representations of a first target image and a second target image, and an image atlas file in which unique image elements are arranged, in accordance with an embodiment of the present disclosure.

Referring to FIG. 3, illustrated are simple schematic representations of a first target image 300a and a second target image 300b, and an image atlas file 300' in which unique image elements are arranged, in accordance with an embodiment of the present disclosure. In an example, the first target image 300a may represent a character, for which image elements 302a, 304, 306 and 308a-b representing a head, arms, a torso, and legs of the character, respectively, are identified. Additionally, in this example, the second target image 300b represents the character riding a vehicle, for which image elements 302b, 310, 312 and 314a-b representing the head, an air dam, a body, and wheels of the vehicle, respectively, are identified.

As shown, only one instance each of non-unique image elements 302a-b, non-unique image elements 308a-b and non-unique image elements 314a-b are packed into the image atlas file 300'. Moreover, as shown, the image elements 304, 310 and 312 are rotated prior to packing, in order to reduce empty spaces in the image atlas file 300'.

Figure 4A:
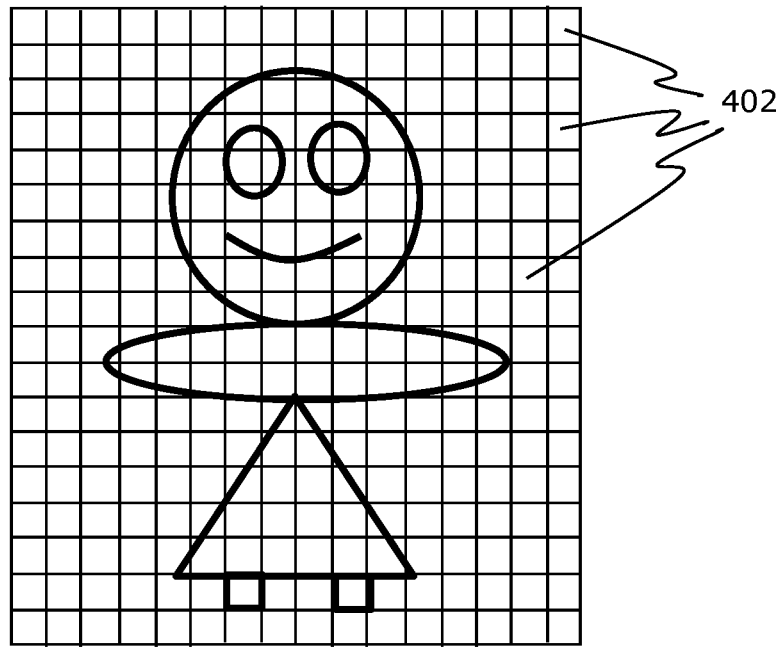
FIGS. 4A-4C illustrate sub-steps of a step of identifying image elements, according to an embodiment of the present disclosure.
Figure 4B:
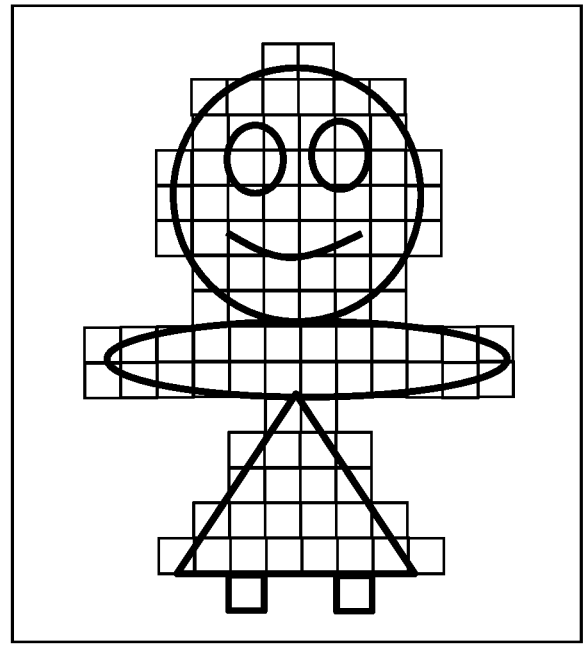
Figure 4C:
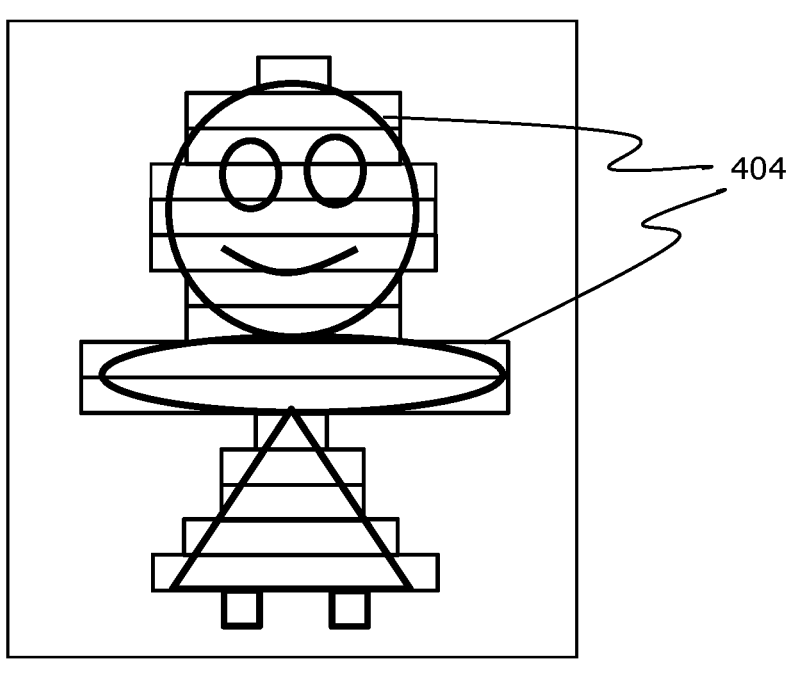

Referring next to FIGS. 4A-4C, illustrated are sub-steps of the step of identifying image elements, according to an embodiment of the present disclosure. The sub-steps have been illustrated by taking an example of the first target image 300a. With reference to FIG. 4A, the first target image 300a is divided into a plurality of blocks 402. Based on alpha values for pixels of a given block, it is determined whether the given block is transparent or non-transparent. In FIG. 4A, blocks depicting a part of the aforesaid character are non-transparent, while remaining blocks are transparent. All transparent blocks are ignored, as shown in FIG. 4B. In other words, alpha elimination is performed as shown in FIG. 4B. Only non-transparent blocks are used to create the image elements as described below.

For each horizontal line of blocks, non-transparent blocks located consecutively on said horizontal line are merged to create a corresponding horizontal image sub-element 404, as shown in FIG. 4C. Next, consecutive horizontal image sub-elements 404 that start at a same horizontal position coordinate or at a predefined horizontal distance from the same horizontal position coordinate, and that have a same length or have a length greater than or smaller than the same length by a predefined length, are vertically merged to create a corresponding image element. In this way, the image elements 302a, 304, 306 and 308a-b representing the head, the arms, the torso, and the legs of the character, respectively, are identified.

Although not illustrated in figures, for each vertical line of blocks, non-transparent blocks located consecutively on said vertical line are merged to create a corresponding vertical image sub-element; and consecutive vertical image sub-elements that start at a same vertical position coordinate or at a predefined vertical distance from the same vertical position coordinate, and that have a same breadth or have a breadth greater than or smaller than the same breadth by a predefined breadth, are horizontally merged to create a corresponding image element.

In the illustrated example, a total number of image elements created from the horizontal image sub-elements 404 is equal to a total number of image elements created from the vertical image sub-elements; therefore, the image elements created from the horizontal image sub-elements are selected.

Figure 5:
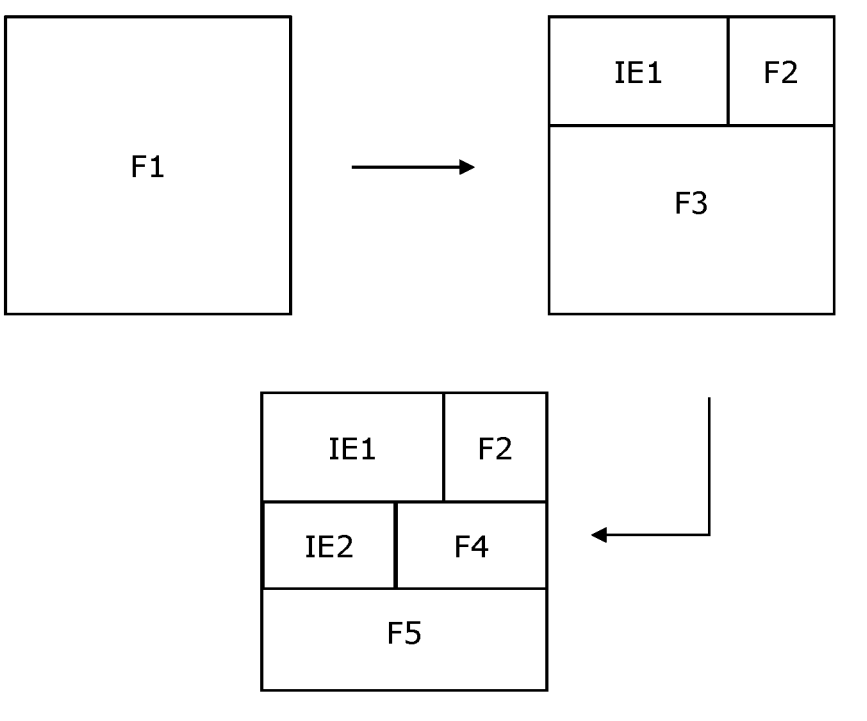
FIG. 5 depicts how image elements are arranged into an image atlas file, in accordance with an embodiment of the present disclosure.

FIG. 5 depicts how image elements are arranged into an image atlas file, in accordance with an embodiment of the present disclosure. The image elements are sorted by length or breadth, and packed into the image atlas file one-by-one, in an order of decreasing length or breadth. Optionally, a given image element is packed at a predefined corner of a free space available in the image atlas file. With reference to FIG. 5, the predefined corner is the uppermost leftmost corner of a free space available in the image atlas file.

As shown in FIG. 5, at a beginning of said packing, an entirety of the image atlas file is available as a free space F1. After a first image element IE1 is packed at the uppermost leftmost corner of the free space F1, the free space available in F1 is divided into two parts F2 and F3 of the free space. Next, a second image element IE2 is packed at the uppermost leftmost corner of one of the two parts F2 and F3 of the free space. As shown, F3 is selected for packing the second image element IE2 based on a length of the second image element IE2. The free space available in F3 is divided into two more parts F4 and F5 of the free space. This process is performed iteratively until all the image elements are packed into the image atlas file.

Figure 6A:
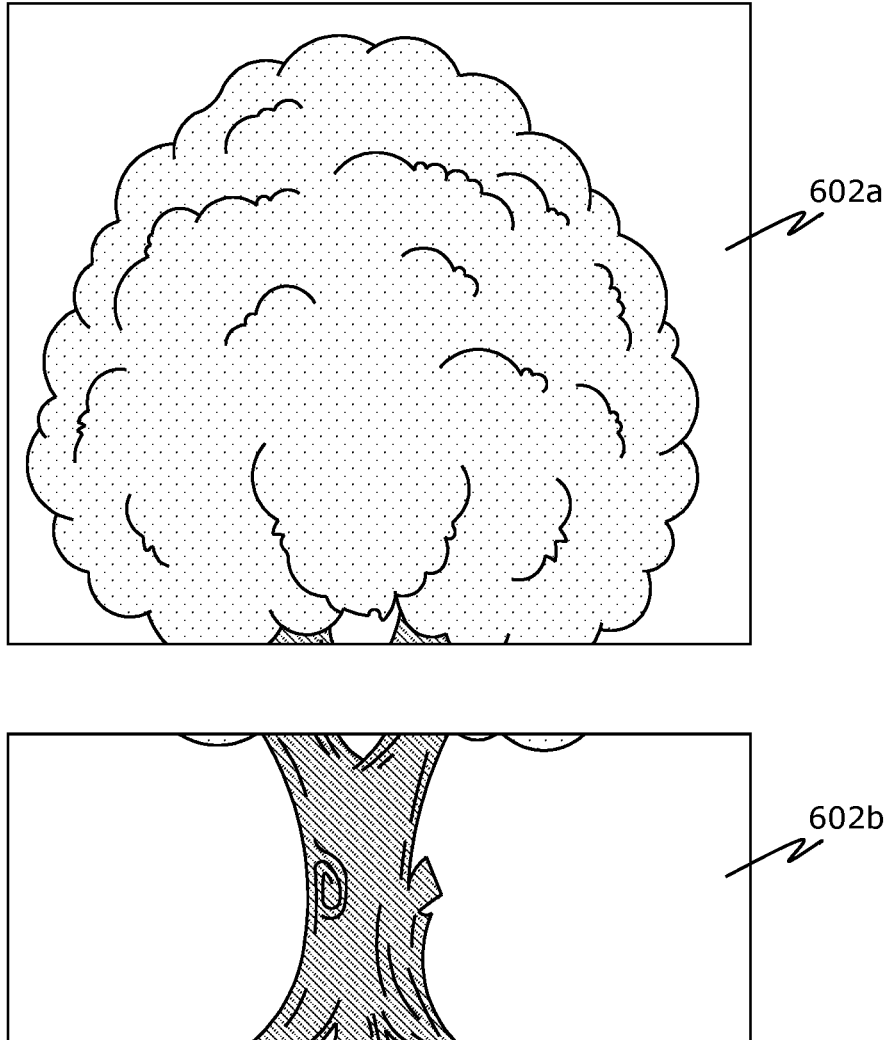
FIGS. 6A-6C illustrate certain steps of a method for encoding target images into an image atlas file, in accordance with an embodiment of the present disclosure.
Figure 6B:
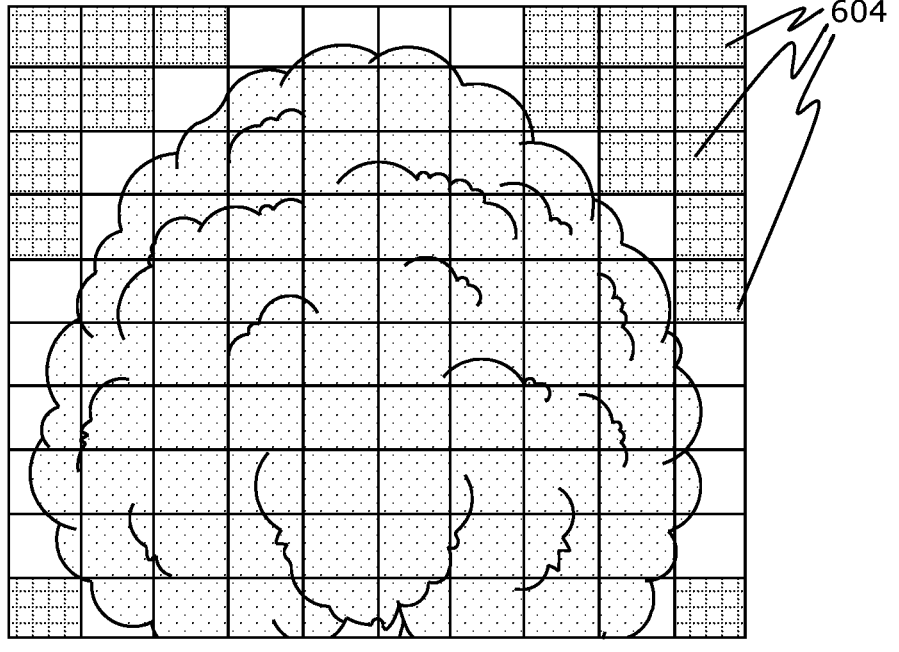
Figure 6B:
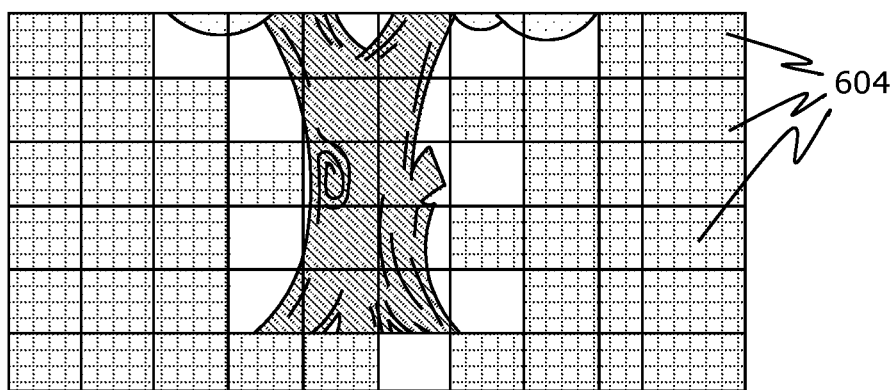
Figure 6C:
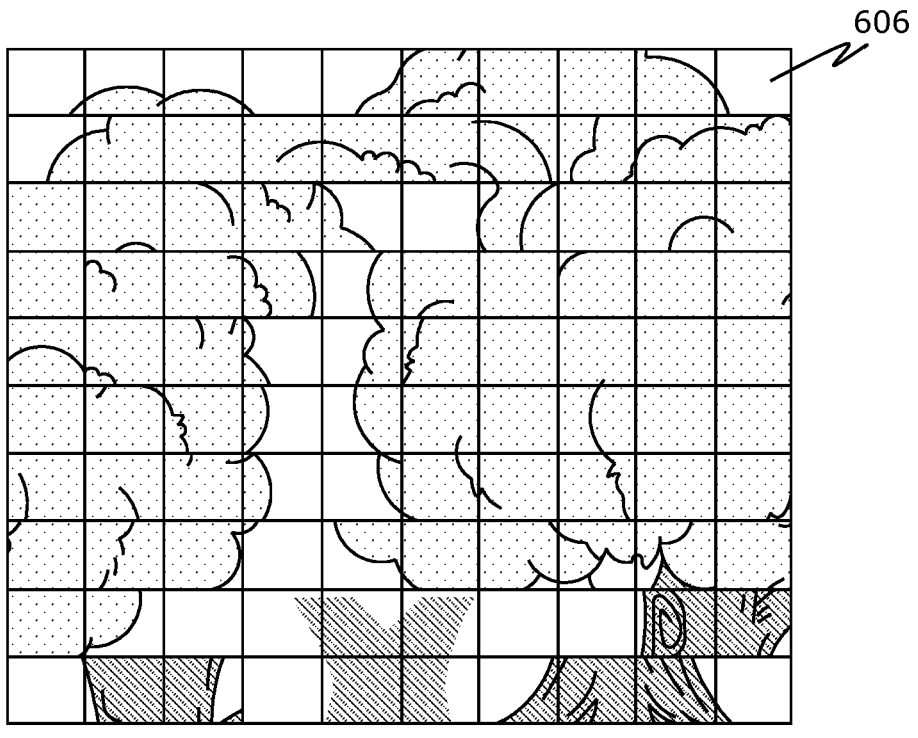

Referring next to FIGS. 6A-6C, illustrated are certain steps of a method for encoding target images 602a and 602b into an image atlas file 606, in accordance with an embodiment of the present disclosure. With reference to FIG. 6A, the target images 602a and 602b are shown as two separate images from which an image of a tree can be composed.

The target images 602a and 602b are divided into blocks, as shown in FIG. 6B. Transparent blocks 604 (for example, blocks whose alpha values are zero) are identified, as shown in FIG. 6B. The transparent blocks 604 are ignored (namely, eliminated). Subsequently, image elements present in the target images 602a and 602b are identified, and a set of unique image elements is then created. Finally, the unique image elements are arranged into the image atlas file 606 in a manner that empty spaces in the image atlas file 606 are reduced, for example as shown in FIG. 6C.

It is evident from FIGS. 6A-6C that the size of the image atlas file 606 is smaller than a sum of the sizes of the target images 602a and 602b. Consequently, by storing and transferring the image atlas file 606 and its metadata file, instead of the target images 602a and 602b, a requirement of computational resources for memory, processing and network transfer is greatly reduced in comparison to conventional encoding methods and encoders.

FIGS. 3, 4A-4C, 5 and 6A-6C are merely examples, which should not unduly limit the scope of the claims herein. The person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Expressions such as "may" and "can" are used to indicate optional features, unless indicated otherwise in the foregoing. Reference to the singular is also to be construed to relate to the plural.

The invention claimed is:

1. A method for encoding one or more target images into an image atlas file, the method comprising:
   identifying image elements present in the one or more target images;
   creating a set of unique image elements, the set comprising each unique image element identified in the one or more target images and only one instance of each non-unique image element identified in the one or more target images as a corresponding unique image element;
   arranging the unique image elements of the set into the image atlas file in a manner that empty spaces in the image atlas file are reduced; and
   generating a metadata file corresponding to the image atlas file, the metadata file comprising meta information of each target image, wherein meta information of a given target image is indicative of locations and dimensions of unique image elements in the image atlas file that are required to compose the given target image.

2. The method according to claim 1, wherein the step of identifying the image elements comprises:
   dividing a given target image into a plurality of blocks;
   for each horizontal line of blocks, merging non-transparent blocks located consecutively on said horizontal line to create a corresponding horizontal image sub-element;
   vertically merging consecutive horizontal image sub-elements that start at a same horizontal position coordinate or at a predefined horizontal distance from the same horizontal position coordinate, and that have a same length or have a length greater than or smaller than the same length by a predefined length, to create a corresponding image element;
   for each vertical line of blocks, merging non-transparent blocks located consecutively on said vertical line to create a corresponding vertical image sub-element;
   horizontally merging consecutive vertical image sub-elements that start at a same vertical position coordinate or at a predefined vertical distance from the same vertical position coordinate, and that have a same breadth or have a breadth greater than or smaller than the same breadth by a predefined breadth, to create a corresponding image element;
   if a total number of image elements created from the horizontal image sub-elements is smaller than or equal to a total number of image elements created from the vertical image sub-elements, selecting the image elements created from the horizontal image sub-elements; and
   if the total number of image elements created from the horizontal image sub-elements is larger than the total number of image elements created from the vertical image sub-elements, selecting the image elements created from the vertical image sub-elements.

3. The method according to claim 2, wherein the step of identifying the image elements further comprises:
   detecting, for a given block, whether alpha values of all pixels of the given block lie below a predefined threshold value;
   when it is detected that the alpha values of all the pixels of the given block lie below the predefined threshold value, discarding the given block.

4. The method according to claim 2, wherein the step of dividing the given target image into the plurality of blocks is performed iteratively.

5. The method according to claim 2, wherein the given target image is divided into the plurality of blocks, based on at least one parameter comprising at least one of: similarity of colour values of neighbouring pixels, a gradient of colour values across pixels, or a frequency with which colour values change across pixels.

6. The method according to claim 1, further comprising cropping out rows and/or columns of consecutive transparent pixels from a given image element prior to arranging the image elements into the image atlas file.

7. The method according to claim 1, wherein the step of arranging the image elements into the image atlas file comprises:
   sorting the image elements by length or breadth; and
   packing the image elements into the image atlas file one-by-one, in an order of decreasing length or breadth.

8. The method according to claim 7, wherein a given image element is packed at a predefined corner of a free space available in the image atlas file.

9. The method according to claim 1, wherein the step of arranging the image elements into the image atlas file comprises layering image elements that include a common region having same pixel values, wherein the layered image elements overlap at least partially in the image atlas file.

10. The method according to claim 1, wherein the meta information of the given target image is indicative of, for a given unique image element that is required to compose the given target image, at least one of: a rotation to be applied to the given unique image element, a translation to be applied to the given unique image element, a scaling to be applied to the given unique image element, a level of transparency to be applied to the given unique image element, a geometric transformation to be applied to the given unique image element, an axis or a centre about which the given unique image element is to be mirrored, whether the given unique image element is to be duplicated, or a location in the given target image where the given unique image element is to be inserted.

11. A method for decoding an image atlas file to compose one or more target images at a computing device, the method comprising:

obtaining the image atlas file corresponding to the one or more target images, the image atlas file comprising a set of unique image elements related to the one or more target images, the unique image elements being arranged in the image atlas file in a manner that empty spaces in the image atlas file are reduced;

obtaining a metadata file corresponding to the image atlas file, the metadata file comprising meta information of each target image, wherein meta information of a given target image is indicative of locations and dimensions of unique image elements in the image atlas file that are required to compose the given target image;

for the given target image, extracting from the image atlas file the unique image elements that are required to compose the given target image, based on the meta information of the given target image;

composing the one or more target images from the unique image elements, extracted from the image atlas file, based on corresponding meta information from the metadata file; and displaying the composed one or more target images at the computing device.

12. An encoder for encoding one or more target images into an image atlas file, wherein the encoder comprises at least one processor configured to:

identify image elements present in the one or more target images;

create a set of unique image elements, the set comprising each unique image element identified in the one or more target images and only one instance of each non-unique image element identified in the one or more target images as a corresponding unique image element;

arrange the unique image elements of the set into the image atlas file in a manner that empty spaces in the image atlas file are reduced; and generate a metadata file corresponding to the image atlas file, the metadata file comprising meta information of each target image, wherein meta information of a given target image is indicative of locations and dimensions of unique image elements in the image atlas file that are required to compose the given target image.

13. The encoder according to claim 12, wherein, when identifying the image elements, the at least one processor is configured to:

divide a given target image into a plurality of blocks;

for each horizontal line of blocks, merge non-transparent blocks located consecutively on said horizontal line to create a corresponding horizontal image sub-element;

vertically merge consecutive horizontal image sub-elements that start at a same horizontal position coordinate or at a predefined horizontal distance from the same horizontal position coordinate, and that have a same length or have a length greater than or smaller than the same length by a predefined length, to create a corresponding image element;

for each vertical line of blocks, merge non-transparent blocks located consecutively on said vertical line to create a corresponding vertical image sub-element;

horizontally merge consecutive vertical image sub-elements that start at a same vertical position coordinate or at a predefined vertical distance from the same vertical position coordinate, and that have a same breadth or have a breadth greater than or smaller than the same breadth by a predefined breadth, to create a corresponding image element;

if a total number of image elements created from the horizontal image sub-elements is smaller than or equal to a total number of image elements created from the vertical image sub-elements, select the image elements created from the horizontal image sub-elements; and if the total number of image elements created from the horizontal image sub-elements is larger than the total number of image elements created from the vertical image sub-elements, select the image elements created from the vertical image sub-elements.

14. The encoder according to claim 13, wherein when identifying the image elements, the at least one processor is configured to:

detect, for a given block, whether alpha values of all pixels of the given block lie below a predefined threshold value;

when it is detected that the alpha values of all the pixels of the given block lie below the predefined threshold value, discard the given block.

15. The encoder according to claim 13, wherein the at least one processor is configured to divide the given target image into the plurality of blocks iteratively.

16. The encoder according to claim 13, wherein the given target image is divided into the plurality of blocks, based on at least one parameter comprising at least one of: similarity of colour values of neighbouring pixels, a gradient of colour values across pixels, or a frequency with which colour values change across pixels.

17. The encoder according to claim 12, wherein the at least one processor is configured to crop out rows and/or columns of consecutive transparent pixels from a given image element prior to arranging the image elements into the image atlas file.

18. The encoder according to claim 12, wherein, when arranging the image elements into the image atlas file, the at least one processor is configured to:

sort the image elements by length or breadth; and pack the image elements into the image atlas file one-by-one, in an order of decreasing length or breadth.

19. The encoder according to claim 18, wherein a given image element is packed at a predefined corner of a free space available in the image atlas file.

20. The encoder according to claim 12, wherein, when arranging the image elements into the image atlas file, the at least one processor is configured to layer image elements that include a common region having same pixel values, wherein the layered image elements overlap at least partially in the image atlas file.

21. The encoder according to claim 12, wherein the meta information of the given target image is indicative of, for a given unique image element that is required to compose the given target image, at least one of: a rotation to be applied to the given unique image element, a translation to be applied to the given unique image element, a scaling to be applied to the given unique image element, a level of transparency to be applied to the given unique image element, an axis about which the given unique image element is to be mirrored, or whether the given unique image element is to be duplicated.

22. A decoder for decoding an image atlas file to compose one or more target images at a computing device, the decoder comprising at least one processor configured to:

obtain the image atlas file corresponding to the one or more target images, the image atlas file comprising a set of unique image elements related to the one or more target images, the unique image elements being arranged in the image atlas file in a manner that empty spaces in the image atlas file are reduced;

obtain a metadata file corresponding to the image atlas file, the metadata file comprising meta information of each target image, wherein meta information of a given target image is indicative of locations and dimensions of unique image elements in the image atlas file that are required to compose the given target image;

for the given target image, extract from the image atlas file the unique image elements that are required to compose the given target image, based on the meta information of the given target image;

compose the one or more target images from the unique image elements, extracted from the image atlas file, based on corresponding meta information from the metadata file; and display the composed one or more target images at the computing device.

23. The decoder according to claim 22, wherein the meta information of the given target image is indicative of, for a given unique image element that is required to compose the given target image, at least one of: a rotation to be applied to the given unique image element, a translation to be applied to the given unique image element, a scaling to be applied to the given unique image element, a level of transparency to be applied to the given unique image element, a geometric transformation to be applied to the given unique image element, an axis or a centre about which the given unique image element is to be mirrored, whether the given unique image element is to be duplicated, or a location in the given target image where the given unique image element is to be inserted.

* * * * *